United States Patent
Creamer et al.

(10) Patent No.: US 7,839,983 B2
(45) Date of Patent: *Nov. 23, 2010

(54) TELECOMMUNICATIONS VOICE SERVER LEVERAGING APPLICATION WEB-SERVER CAPABILITIES

(75) Inventors: Thomas E. Creamer, Boca Raton, FL (US); Victor S. Moore, Lake City, FL (US); Wendi L. Nusbickel, Boca Raton, FL (US); Ricardo Dos Santos, Boca Raton, FL (US); James J. Sliwa, Raleigh, NC (US)

(73) Assignee: Nuance Communications, Inc., Burlington, MA (US)

( * ) Notice: Subject to any disclaimer, the term of this patent is extended or adjusted under 35 U.S.C. 154(b) by 151 days.

This patent is subject to a terminal disclaimer.

(21) Appl. No.: 12/166,806

(22) Filed: Jul. 2, 2008

(65) Prior Publication Data

US 2008/0267367 A1    Oct. 30, 2008

Related U.S. Application Data

(63) Continuation of application No. 10/833,525, filed on Apr. 28, 2004, now Pat. No. 7,412,038.

(51) Int. Cl.
*H04M 11/06* (2006.01)
(52) U.S. Cl. .............. 379/88.13; 370/260; 370/352; 379/88.22; 379/93.01; 379/201.03; 434/118; 455/426.1; 704/243; 704/270.1; 709/223; 709/230; 719/310; 719/311; 719/314
(58) Field of Classification Search .......... 370/259, 370/260, 352; 379/88.13, 88.22, 201.03, 379/93.01; 434/118; 455/426.1; 704/243, 704/270.1; 709/223, 230; 719/310, 311, 719/314
See application file for complete search history.

(56) References Cited

U.S. PATENT DOCUMENTS

| 5,664,058 | A  | * | 9/1997  | Vysotsky .................. 704/243 |
|-----------|----|---|---------|------------------------------------|
| 6,196,846 | B1 | * | 3/2001  | Berger et al. ............... 434/118 |
| 6,272,126 | B1 | * | 8/2001  | Strauss et al. .............. 370/352 |
| 6,304,572 | B1 |   | 10/2001 | Christie |
| 6,396,907 | B1 |   | 5/2002  | Didcock |
| 6,501,832 | B1 |   | 12/2002 | Saylor et al. |
| 6,522,645 | B1 | * | 2/2003  | Lee et al. ................... 370/352 |
| 6,553,427 | B1 | * | 4/2003  | Chang et al. ............... 719/314 |
| 6,574,661 | B1 | * | 6/2003  | Delano et al. ............... 709/223 |
| 6,584,076 | B1 | * | 6/2003  | Aravamudan et al. ....... 370/260 |
| 7,099,442 | B2 | * | 8/2006  | Da Palma et al. .......... 379/88.22 |

(Continued)

*Primary Examiner*—Gerald Gauthier
(74) *Attorney, Agent, or Firm*—Wolf, Greenfield & Sacks, P.C.

(57) ABSTRACT

A method for providing voice telephony services can include the step of receiving a call via a telephone gateway. The telephone gateway can convey call identifying data to a resource connector. A media port can be responsively established within a media converter that is communicatively linked to the telephone gateway through a port associated with the call. A call description object can be constructed that includes the call identifying data and an identifier for the media port. The call description object can be conveyed to a telephony application server that provides at least one speech service for the call. The telephony application server can initiate at least one programmatic action of a communicatively linked speech engine. The speech engine can convey results of the programmatic action to the media converter through the media port. The media converter can stream speech signals for the call based upon the results.

34 Claims, 2 Drawing Sheets

U.S. PATENT DOCUMENTS

| | | | |
|---|---|---|---|
| 7,412,038 B2 * | 8/2008 | Creamer et al. | 379/88.13 |
| 7,448,041 B2 * | 11/2008 | Creamer et al. | 719/311 |
| 7,552,225 B2 * | 6/2009 | Creamer et al. | 709/230 |
| 2003/0125023 A1 * | 7/2003 | Fishler | 455/426 |
| 2005/0243977 A1 * | 11/2005 | Creamer et al. | 379/88.13 |
| 2005/0243981 A1 * | 11/2005 | Creamer et al. | 379/88.22 |
| 2005/0246713 A1 * | 11/2005 | Creamer et al. | 719/310 |
| 2008/0267367 A1 * | 10/2008 | Creamer et al. | 379/88.13 |
| 2008/0267370 A1 * | 10/2008 | Creamer et al. | 379/93.01 |
| 2008/0312933 A1 * | 12/2008 | Creamer et al. | 704/270.1 |
| 2009/0059818 A1 * | 3/2009 | Pickett | 370/259 |

* cited by examiner

TELECOMMUNICATIONS VOICE SERVER LEVERAGING APPLICATION WEB-SERVER CAPABILITIES

CROSS REFERENCE TO RELATED APPLICATIONS

This application is a continuation of, and accordingly claims the benefit from, U.S. patent application Ser. No. 10/833,525, now issued U.S. Patent No. 7,412,038, which was filed in the U.S. Patent and Trademark Office on Apr. 28, 2004.

BACKGROUND

1. Field of the Invention

The present invention relates to the field of telecommunications and, more particularly, to a telecommunications voice server.

2. Description of the Related Art

The information age has heralded advancements in data accessibility that alter the manner in which people interact socially and economically. Information tools like personal data assistances (PDA's), Web-enabled mobile telephones, computers, vehicle navigation systems, and the like can immerse users in pools of information designed to avoid inconveniences and to generally ease hardships inherent in hectic lifestyles. For example, information tools can help users avoid traffic, maintain social contacts, receive important business email when away from the office, and the like. A key component of the technological infrastructure providing these capabilities includes voice server systems which provide a multitude of speech services, like automatic speech recognition services, synthetic speech generation services, transcription services, language and idiom translation services, and the like.

Implementing robust voice servers in an extensible, cost efficient manner has been a daunting challenge to service providers. Speech technologies are constantly changing and can require vast hardware and software resources. For example, natural sounding speech generation is commonly performed by concatentative text-to-speech (CTTS) engines, even though hundreds of megabytes of information can be required for storing the phonemes associated with a single CTTS voice, and even though significant processing resources can be involved in constructing synthetic speech from these phonemes. Providing other speech services provides similar challenges. For example, natural language interpretation within ASR engines can require vast neural networks to interpret speech input with reasonable accuracy.

As if these complexities were not enough, telecommunication protocols, call management services, and telephony features must be managed by a voice server that provides speech services for telephony communications. That is, conventional voice server systems include call session management features, remote access capabilities, lifecycle management, load distribution, and other telephony related features that are typically handled internally for performance reasons. Performance of a voice server can be significant because voice services are often required for real time and near-real time tasks making appreciable processing delays problematic. It would be highly advantageous, if telecommunication related features of existing telecommunication application servers could be leveraged by voice server systems so that these features need not be separately implemented within voice server systems.

SUMMARY OF THE INVENTION

The present invention provides a complete telecommunications voice server that provides telephony, speech processing, and application services via a standard language using a service browser. The voice server described herein leverages capabilities that exist within an application server, such as the Websphere Application Server (WAS) from International Business Machines, Inc. of Armonk, N.Y. Notably, the present invention utilizes an existing product base when implementing the voice server minimizes code development and maintenance cost while maximizing functionality.

For example, when integrated with the WAS, the disclosed voice server need not separately implement session management, lifecycle management, remote access, error tracking, pooling, and similar functionality. Since each of these capabilities have been optimized for the WAS, the runtime performance and resource efficiency of the disclosed voice server is high. Moreover when integrated with the WAS, the disclosed voice server system can utilize software objects and libraries, such as Java™ 2 Platform, Enterprise Edition (J2EE), developed for and utilized by the WAS, further minimizing development and maintenance costs, while providing a platform independent, scalable, and extensible solution.

One aspect of the present invention can include a method for providing voice telephony services. The method can include the step of receiving a call via a telephone gateway. The telephone gateway can convey call identifying data to a resource connector. A media port can be responsively established within a media converter that is communicatively linked to the telephone gateway through a port associated with the call. A call description object (CDO) can be constructed that includes the call identifying data and an identifier for the media port. The CDO can be conveyed to a telephony application server that provides at least one speech service for the call. The telephony application server can initiate at least one programmatic action of a communicatively linked speech engine. The speech engine can convey results of the programmatic action to the media converter through the media port. The media converter can stream speech signals for the call based upon the results.

Another aspect of the present invention can include a telephony system with speech capabilities. The system can include a telephony gateway, a telephone application server, a resource connector, and a media converter. The telephony gateway can be communicatively linked to a telephone network, such as a public switched telephone network (PSTN). The telephone application server can provide at least one speech service. In one embodiment, the telephone application server can include a WAS. The resource connector can be a communication intermediary between the telephone gateway and the telephone application server, where call information can be gathered by the resource connector and conveyed to the telephone application server. The media converter can be a communication intermediary between the telephone gateway and the application server, where speech signals can be streamed between the telephone gateway and at least one speech engine.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
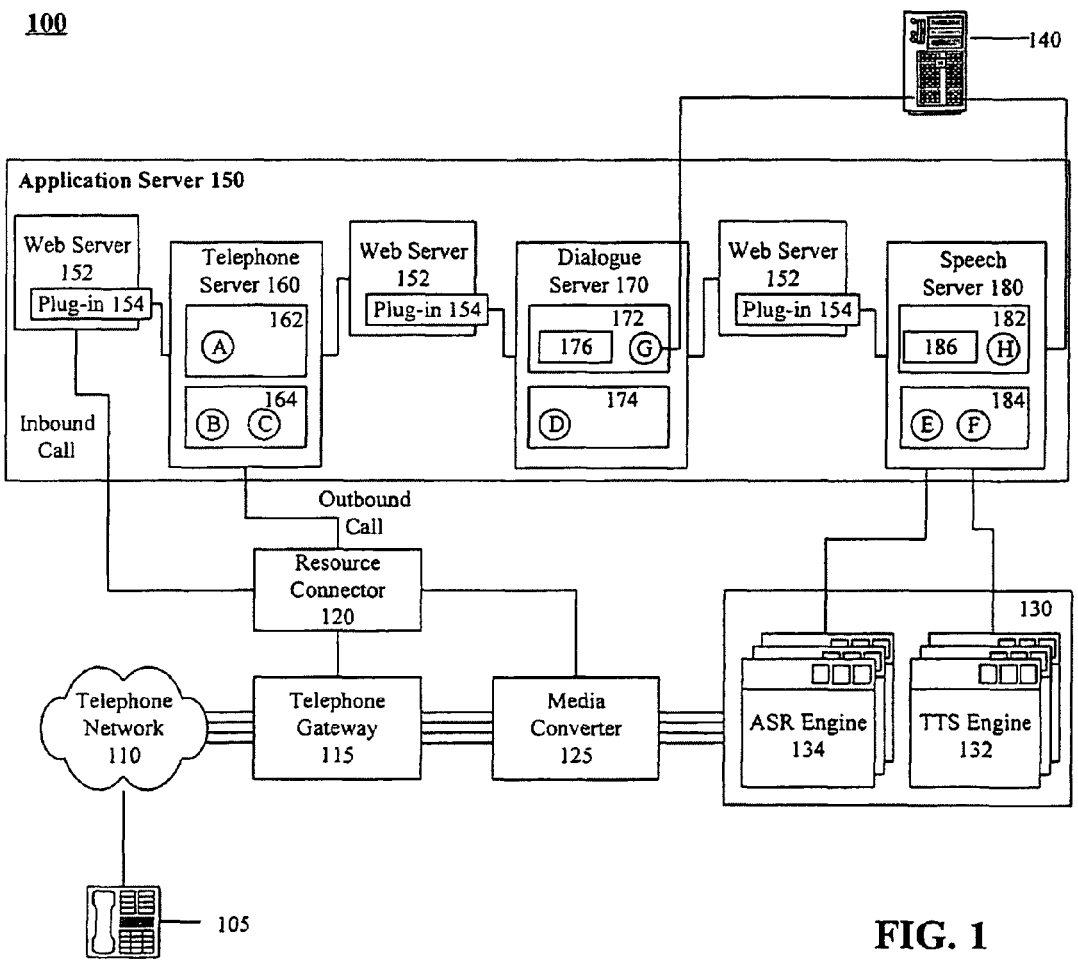
FIG. 1 is a schematic diagram illustrating a telecommunication application server providing speech services in accordance with the inventive arrangements disclosed herein.

FIG. 1 is a schematic diagram illustrating a telephony system 100 in accordance with the inventive arrangements disclosed herein. The system 100 can include a telephone gateway 115, a telephony application server 150, and a multitude of speech engines 130. The telephone gateway 115 can include hardware or software that translates protocols and/or routes calls between a telephone network 110 and the application sever 150. For example, the telephone gateway 115 can include a Cisco 2600 series router from Cisco Systems, Inc. of San Jose, Calif., a Cisco, a Cisco 5300 series gateway, a Digital Trunk eXtended Adapter (DTXA), a Intel (R) Dialogic (R) Adaptor from Intel Corporation of Santa Clara, Calif., and the like. The speech engines 130 can include one or more automatic speech recognition engines 134, one or more text to speech engines 132, and other speech related engines and/or services.

The application server 150 can include an engine that functions as a reliable foundation for handling high volume secure transactions and Web services. In one embodiment, the application server 150 can be a Websphere Application Server (WAS).

The application server 150 can also include a multitude of component servers, such as telephone server 160, dialogue server 170, and speech server 180, communicatively linked via a multitude of Web servers 152. Each Web server 152 can include one or more plug-ins 154, where each plug-in 154 can include routines for conveying data to particular component servers within the application server 150. Each of the component servers of the application server 150 can be implemented as Virtual Machines, such as virtual machines adhering to the Java 2 Enterprise Edition (J2EE) specification.

In one arrangement, component servers of the application server 150 can also be distributed across a network. In such an arrangement, data can be conveyed to each of the component servers via the Web servers 152. The Web servers 152 can utilize Hypertext Transfer Protocol Format (HTTP) for compatibility with IP sprayers and firewalls. The invention, however, is not limited in this regard and other data conveyance protocols can be used. For example, file transfer protocol (FTP) can be used to convey data between component servers.

The component servers within the application server 150 can include a telephone server 160, a dialogue server 170, and a speech server 180. The telephone server 160 can control the setup, monitoring, and tear down of phone calls. In one arrangement, telephone server 160 can include a web container 162 and an Enterprise Java Beans (EJB) container 164. Moreover, the telephone server 160 can include a call control servlet (servlet A), a call control EJB (Bean B), and a call control interpreter EJB (Bean C).

The dialogue server 170 can manage tasks relating to call dialogue for the application server 150. In one arrangement, the dialogue server 170 can include web container 172 and EJB container 174. Moreover, the dialogue server 170 can include a voice markup interpreter EJB (Bean D).

The speech server 180 can handle one or more speech services for the application server 150. In one arrangement, the speech server 180 can include web container 182 and EJB container 184. Moreover, the speech server 180 can include an automatic speech recognition (ASR) EJB (Bean E) as well as a text-to-speech EJB (Bean F). Bean E and Bean F can be interface components, each of which interfaces with an identified speech engine 130. It should be appreciated by one of ordinary skill in the art that the telephone server 160, the dialogue server 170, and the speech server 180 can be arranged in a multitude of fashions and that the invention is not to be limited to the illustrative arrangement presented herein.

The system 100 can also include a media converter 125 and a resource connector 120. The media converter 125 can be a communication intermediary for streaming speech data configured to resolve protocol issues between the telephone gateway 115 and speech engines 130. Speech data can be streamed bi-directionally between the telephone gateway 115 and the speech engines 130 as appropriate.

The resource connector 120 can be a communication intermediary between the telephone gateway 115 and the application server 150 and/or media converter 125 that allocates resources for calls. In one embodiment, the resource connector 120 can normalize a telephony request into a request that is acceptable by the application server 150, thereby providing a generic means for the telephone gateway 115 to interface with the application server 150. For example, if the application server 150 communicates using HyperText Transfer Protocol (HTTP) messages, the resource connector 120 can convert a telephony request into an appropriate HTTP message. In another example, if the application server 150 utilizes a Session Initiation Protocol (SIP), the resource connector 120 can convert a telephony request into an appropriate SIP message.

The system 100 can further include one or more remote servers 140. Each remote server 140 can perform programmatic actions requiring functions inherent to the application server 150 using software interfaces G and H, which can be Java software objects. Software interfaces G and H can expose otherwise private functions and parameters to remote processes. For example, the software interfaces G and H can permit server 140 to access data objects within dynamic cache service, such as the dynacache included within WAS. In one embodiment, the software interface G can include a call control markup language and a voice markup language cache servlet. In another embodiment, the software interface H can include a grammar cache servlet. It should be noted that the software interfaces G and H can be disposed throughout the application server and need not be arranged as illustrated within FIG. 1. That is, each of the telephone server 160, the dialogue server 170, the speech server 180 can include one or more of the software interfaces G and/or H.

In operation, a user 105 can initiate a telephone call. The call can be conveyed through a telephone network 110, such as a Public Switched Telephone Network (PSTN), and can be received by the telephone gateway 115. The telephone gateway 115 can convey call information to the resource connector 120. For example, call information can be conveyed using a session initiation protocol (SIP). In particular embodiments, the telephone gateway 115 can also convert circuit-switched data to packet-switched data for processing by the resource connector 120, media converter 125, and application server 150. The resource connector 120 can generate a call descriptor object (CDO) that contains call related information, including the port(s) that telephone gateway 115 has assigned to the call. In one embodiment, the CDO can be a Java object and the assigned port(s) can include Reliable Data Protocol (RPT) port(s).

Once generated, the CDO can be sent to the media converter 125, which can establish one or more media ports that can be used for the call. Identifiers, which can be Uniform Resource Identifiers (URI), associated with the reserved media ports can be added to the CDO. The CDO can then be conveyed to various component servers within the application server 150 as needed, including the telephone server 160, the dialogue server 170, and the speech server 180. As the CDO is conveyed through component servers, additional information can be included within it. For example, a URI for a call control component within the telephone server 160 can be included within the CDO as the CDO is conveyed through the telephone server 160. Speech services can be triggered within the application server 150 as appropriate and provided for the call via the media converter 125 as needed in accordance with the details of the call being handled by the application server 150.

Figure 2:
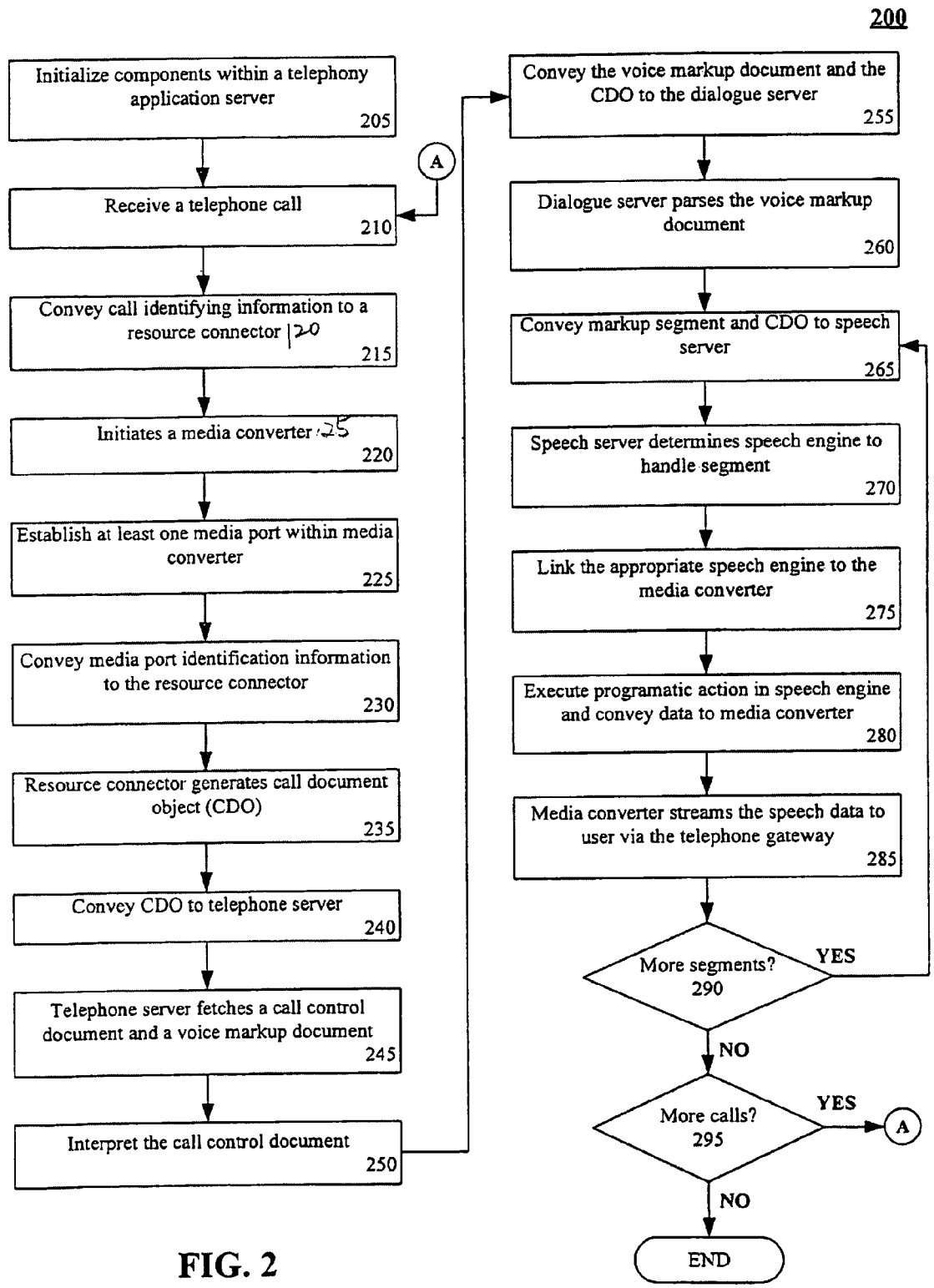
FIG. 2 is a flow chart illustrating a method for implementing telecommunication speech services in accordance with the inventive arrangements disclosed herein.

FIG. 2 is a method 200 for implementing telecommunication speech services in accordance with the inventive arrangements disclosed herein. The method 200 can be performed in the context of a telecommunications application server, such as a WAS. The method 200 can begin in step 205, where various telephony application server components can be initialized as appropriate. For example, a servlet within the telephony server component can activate a resource container that functions as a communication intermediary between a telephony gateway and the telephony application server. In another example, a speech server component can allocate a multitude of component interface objects, each interface object being associated with a particular speech engine. For example, a pool of stateless EJBs can be allocated within the speech server, each configured as an interface for a speech engine.

In step 210, a telephony gateway can receive a telephone call that requires at least one speech service. In step 215, call identifying information can be conveyed by telephone gateway to a resource connector. Call identifying information can include a call identifier, a caller telephone number, a called telephone number, a gateway port associated with the call, and so forth. In step 220, the resource connector can initiate a media converter for the call, where the media converter can serve as a communication intermediary between a speech engine and the telephone gateway. In step 225, the media converter can establish a connection with the calling port of the gateway and can establishes at least one media port for receiving speech data. In step 230, the media converter can convey identification information for the established media ports to the resource connector.

In step 235, the resource connector can generate a CDO that includes call identification and media port identification data. In step 240, the resource connector can convey the CDO to the telephone server component of the telephony application server.

In step 245, the telephone server can fetch a call control document and a voice markup document, where the call control document can be a Call Control Extensible Markup Language (CCXML) document and the voice markup document can be a Voice Extensible Markup Language (VoiceXML) document. Identifiers for these documents and/or interpreters for these documents can be added to the CDO. In step 250, the telephone server can manage call control functions by interpreting the call control document. In step 255, the voice markup document and the CDO can be conveyed to a dialogue server component of the telephony application server.

In step 260, the dialogue server can parse the voice markup document into a plurality of work segments called turns. In step 265, the CDO and a turn can be conveyed to a speech server component of the telephony application server. In step 270, the speech server can determine a speech engine to handle the turn. In step 275, the speech server can use the media port identifier within the CDO to link the selected speech engine to the identified media port of the media converter. In step 280, the speech engine can perform at least one programmatic action resulting in a speech output that can be conveyed to the media converter. In step 285, the media converter can stream synthetically generated speech to a calling party via the telephone gateway. The media converter can also receive speech from the calling party and convey it to an appropriate speech engine. In step 290, if there are more turns to process, the method can loop back to step 265, where the next turn can be conveyed to the speech server for processing.

If no more turns exist in step 290, the method can proceed to step 295, where the telephony application server can check to see if there are any more calls that need managed. If so, the method can branch to step 210, where the new telephone call can be received. Otherwise, the method can finish.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for providing voice telephony services comprising the steps of:

receiving a call via a telephone gateway;

said telephone gateway conveying call identifying data to a resource connector;

responsively establishing at least one media port within a media converter that is communicatively linked to the telephone gateway through a port associated with the call;

constructing a call description object that includes said call identifying data and an identifier for said at least one media port;

conveying said call description object to a telephony application server that provides at least one speech service for said call;

said telephony application server initiating at least one programmatic action of a communicatively linked speech engine;

said speech engine conveying results of said programmatic action to said media converter through said at least one media port; and said media converter streaming speech signals for said call based upon said results.

2. The method of claim 1, wherein said telephone application server comprises a telephone server, said method further comprising the steps of:

conveying said call description object to said telephone server;

said telephone server retrieving a call control document and a voice markup document associated with said call; and, said telephone server interpreting said call control document to manage at least one aspect of said call.

3. The method of claim 1, wherein said telephone application server comprises a dialogue server, said method further comprising the steps of:

conveying said call description object and a voice markup document associated with said call and said call description object to said dialogue server; and said dialogue server parsing said voice markup document into a plurality of units of work, wherein each unit of work is capable of being independently processed, and wherein said results of said speech engine are results for one of said units of work.

4. The method of claim 1, wherein said telephone application server comprises a speech server, said method further comprising the steps of:

said speech server receiving said call description object and a voice markup document associated with said call; and said speech server initiating said programmatic action of said speech engine responsive to said speech server interpreting said voice markup document, wherein said speech server conveys said media port identifier to said speech engine.

5. The method of claim 1, wherein said telephone application server comprises a speech server, said method further comprising the steps of:

instantiating a plurality of platform-independent component software objects within said speech server, each software object providing an interface between said speech server and a software engine, wherein said initiating of said programmatic action utilizes one of said component software objects.

6. A machine-readable storage having stored thereon, a computer program having a plurality of code sections, said code sections executable by a machine for causing the machine to perform the steps of:

receiving a call via a telephone gateway;

said telephone gateway conveying call identifying data to a resource connector;

responsively establishing at least one media port within a media converter that is communicatively linked to the telephone gateway through a port associated with the call;

constructing a call description object that includes said call identifying data and an identifier for said at least one media port;

conveying said call description object to a telephony application server that provides at least one speech service for said call;

said telephony application server initiating at least one programmatic action of a communicatively linked speech engine;

said speech engine conveying results of said programmatic action to said media converter through said at least one media port; and said media converter streaming speech signals for said call based upon said results.

7. The machine-readable storage of claim 6, wherein said telephone application server comprises a telephone server, said machine-readable storage further comprising the steps of:

conveying said call description object to said telephone server;

said telephone server retrieving a call control document and a voice markup document associated with said call; and, said telephone server interpreting said call control document to manage at least one aspect of said call.

8. The machine-readable storage of claim 6, wherein said telephone application server comprises a dialogue server, said machine-readable storage further comprising the steps of:

conveying said call description object and a voice markup document associated with said call and said call description object to said dialogue server; and said dialogue server parsing said voice markup document into a plurality of units of work, wherein each unit of work is capable of being independently processed and wherein said results of said speech engine are results for one of said units of work.

9. The machine-readable storage of claim 6, wherein said telephone application server comprises a speech server, said machine-readable storage further comprising the steps of:

said speech server receiving said call description object and a voice markup document associated with said call; and said speech server initiating said programmatic action of said speech engine responsive to said speech server interpreting said voice markup document, wherein said speech server conveys said media port identifier to said speech engine.

10. The machine-readable storage of claim 6, wherein said telephone application server comprises a speech server, said machine-readable storage further comprising the steps of:

instantiating a plurality of platform-independent component software objects within said speech server, each software object providing an interface between said speech server and a software engine, wherein said initiating of said programmatic action utilizes one of said component software objects.

11. A method for providing at least one telecommunication speech service, comprising:

receiving call identifying information identifying a call that requests at least one speech service, the call identifying information further identifying at least one media port for conveying speech data associated with the call;

selecting at least one speech engine to perform at least one programmatic action in connection with the call; and conveying, to the at least one speech engine, an identifier for the at least one media port to enable the at least one speech engine to connect to the at least one media port, wherein the at least one speech engine is configured to convey, via the at least one media port, at least one speech output resulting from the at least one programmatic action.

12. The method of claim 11, wherein the call identifying information comprises a call descriptor object generated by a resource connector configured as an interface for a telephone gateway through which the call was received.

13. The method of claim 12, wherein, upon receiving the call, the resource connector identifies a media converter for the call, the media converter being configured as an interface between the at least one speech engine and the telephone gateway.

14. The method of claim 13, wherein the media converter establishes the at least one media port and conveys to the resource connector information identifying the at least one media port.

15. The method of claim 12, wherein the at least one speech output is rendered to a calling party via the telephone gateway.

16. The method of claim 11, further comprising:
accessing at least one call control document for the call; and
managing at least one call control function associated with the call, at least in part by interpreting the at least one call control document.

17. The method of claim 11, further comprising:
accessing at least one voice markup document for the call; and
parsing the at least one voice markup document to generate at least one unit of work to be handled by the at least one speech engine.

18. The method of claim 17, further comprising:
conveying, to the at least one speech engine, the at least one unit of work along with the identifier for the at least one media port, wherein the at least one speech engine performs the at least one programmatic action based on the at least one unit of work to produce the at least one speech output and conveys the at least one speech output via the at least one media port.

19. A computer-readable storage having encoded thereon computer-executable instructions which, when executed by at least one processor, perform a method for providing at least one telecommunication speech service, the method comprising:
receiving call identifying information identifying a call that requests at least one speech service, the call identifying information further identifying at least one media port for conveying speech data associated with the call;
selecting at least one speech engine to perform at least one programmatic action in connection with the call; and
conveying, to the at least one speech engine, an identifier for the at least one media port to enable the at least one speech engine to connect to the at least one media port, wherein the at least one speech engine is configured to convey, via the at least one media port, at least one speech output resulting from the at least one programmatic action.

20. The computer-readable storage of claim 19, wherein the call identifying information comprises a call descriptor object generated by a resource connector configured as an interface for a telephone gateway through which the call was received.

21. The computer-readable storage of claim 20, wherein, upon receiving the call, the resource connector identifies a media converter for the call, the media converter being configured as an interface between the at least one speech engine and the telephone gateway.

22. The computer-readable storage of claim 21, wherein the media converter establishes the at least one media port and conveys to the resource connector information identifying the at least one media port.

23. The computer-readable storage of claim 20, wherein the at least one speech output is rendered to a calling party via the telephone gateway.

24. The computer-readable storage of claim 19, wherein the method further comprises:
accessing at least one call control document for the call; and
managing at least one call control function associated with the call, at least in part by interpreting the at least one call control document.

25. The computer-readable storage of claim 19, wherein the method further comprises:
accessing at least one voice markup document for the call; and
parsing the at least one voice markup document to generate at least one unit of work to be handled by the at least one speech engine.

26. The computer-readable storage of claim 25, wherein the method further comprises:
conveying, to the at least one speech engine, the at least one unit of work along with the identifier for the at least one media port, wherein the at least one speech engine performs the at least one programmatic action based on the at least one unit of work to produce the at least one speech output and conveys the at least one speech output via the at least one media port.

27. A system for providing at least one telecommunication speech service, comprising at least one processor programmed to:
receive call identifying information identifying a call that requests at least one speech service, the call identifying information further identifying at least one media port for conveying speech data associated with the call;
select at least one speech engine to perform at least one programmatic action in connection with the call; and
convey, to the at least one speech engine, an identifier for the at least one media port to enable the at least one speech engine to connect to the at least one media port, wherein the at least one speech engine is configured to convey, via the at least one media port, at least one speech output resulting from the at least one programmatic action.

28. The system of claim 27, wherein the call identifying information comprises a call descriptor object generated by a resource connector configured as an interface for a telephone gateway through which the call was received.

29. The system of claim 28, wherein, upon receiving the call, the resource connector identifies a media converter for the call, the media converter being configured as an interface between the at least one speech engine and the telephone gateway.

30. The system of claim 29, wherein the media converter establishes the at least one media port and conveys to the resource connector information identifying the at least one media port.

31. The system of claim 28, wherein the at least one speech output is rendered to a calling party via the telephone gateway.

32. The system of claim 27, wherein the at least one processor is further programmed to:
access at least one call control document for the call; and
manage at least one call control function associated with the call, at least in part by interpreting the at least one call control document.

33. The system of claim 27, wherein the at least one processor is further programmed to:

access at least one voice markup document for the call; and parse the at least one voice markup document to generate at least one unit of work to be handled by the at least one speech engine.

34. The system of claim 33, wherein the at least one processor is further programmed to:

convey, to the at least one speech engine, the at least one unit of work along with the identifier for the at least one media port, wherein the at least one speech engine performs the at least one programmatic action based on the at least one unit of work to produce the at least one speech output and conveys the at least one speech output via the at least one media port.

* * * * *